April 4, 1967  E. L. SCHAUB  3,311,959
SCREW-OPERATED TIGHTENING DEVICES
Filed Sept. 21, 1964  2 Sheets-Sheet 2

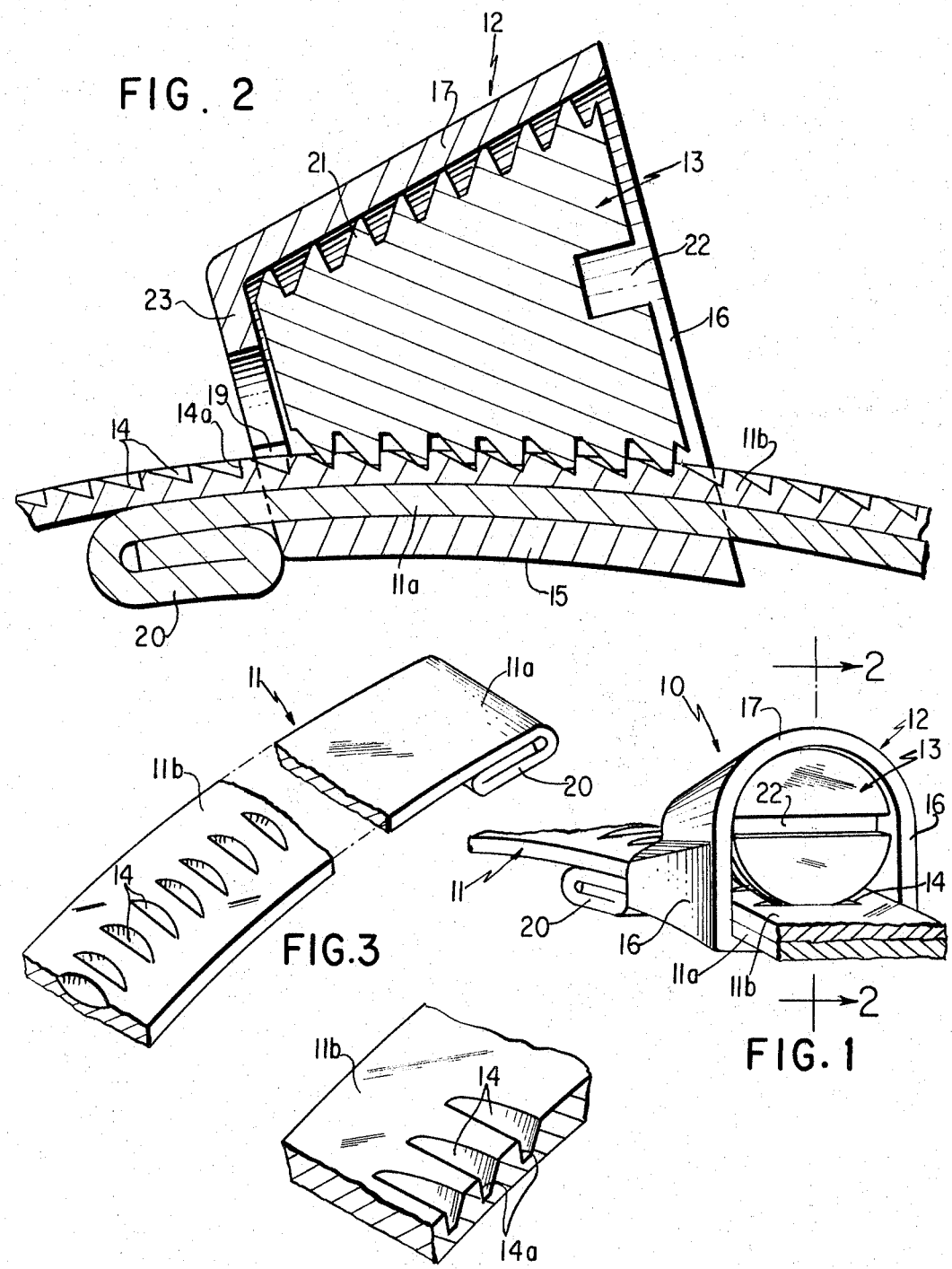

INVENTOR
ERWIN L. SCHAUB
BY
ATTORNEY

United States Patent Office 3,311,959
Patented Apr. 4, 1967

3,311,959
SCREW-OPERATED TIGHTENING DEVICES
Erwin L. Schaub, Middle Village, N.Y., assignor to Ideal Corporation, Brooklyn, N.Y., a corporation of New York
Filed Sept. 21, 1964, Ser. No. 397,922
11 Claims. (Cl. 24—274)

This invention relates generally to screw-operated tightening devices, and is particularly directed to improvements in tightening devices or clamps of the kind including a housing shaped to have a band or strap passed therethrough, and a screw rotatable in the housing and having a spiral thread to engage in serrations or transversely directed cuts spaced apart along the strap so that the latter is drawn through the housing upon rotation of the screw.

Screw-operated tightening devices of the described type have been made in the form of hose clamps wherein the band or strap encircling the hose to be clamped on a pipe end or nipple has one end secured to the housing so that, when the other end portion of the strap is drawn through the housing by the action of the rotated screw on the strap, the effective circumference of the encircling strap is reduced and thereby clamps the hose on the pipe end or nipple. In order to avoid slipping of the strap relative to the screw, existing devices have to be manufactured to close dimensional tolerances and assembled with care, thereby leading to relatively high production costs. Further, most existing hose clamps of the described character seek to ensure engagement of the screw thread with the strap serrations by forming the latter as slots extending completely through the latter, so that the screw thread can penetrate therein to a depth equal to the thickness of the strap. However, a strap or band having slots extending therethrough is disadvantageous in that, when such strap is tightened around a hose, the rubber or elastomeric material of the hose may be extruded through the slots with consequent damage to the hose material. Slots extending completely through the strap also substantially weaken the latter so that the strap must be given a relatively large cross-sectional area for any particular service requirement, thereby increasing the cost of material for the clamp.

The possible extrusion of the hose material and weakening of the strap are avoided by providing the strap with a "coined" thread, that is, transversely directed grooves or recesses opening at only one surface of the strap in place of the slots but then the problem of maintaining engagement of the screw thread with the recesses is accentuated, as the depth of such recesses, and hence the penetration of the thread therein, is necessarily limited to less than the thickness of the strap. It has been proposed to make possible the use of a strap formed with a "coined" thread, by providing a mounting for the screw which causes the thread of the latter to be pressed into the serrations or cuts of the strap in response to the pull exerted on the strap by the screw, but such devices as have been proposed are structurally complex and relatively costly.

Accordingly, it is an object of this invention to provide a reliable screw-operated tightening device of the described character which is simply assembled from a minimum number of parts that can be fabricated with relatively wide dimensional tolerances so as to be capable of relatively inexpensive production.

Another object is to provide a screw-operated tightening device of the described character wherein the co-operative engagement of surfaces formed on the screw and the housing or cage in which the screw is rotated causes a component of force proportional to the pull of the screw on the strap to press the screw thread into the serrations or cuts of the strap.

A further object is to provide an economically feasible screw-operated tightening device that can utilize a "coined" thread on the strap.

In accordance with this invention, a screw-operated tightening device is provided which includes a housing having a base over which a serrated strap is to be drawn and a screw rotatable in the housing and having a frusto-conical spiral thread to engage in serrations of the strap and draw the latter over the base upon rotation of the screw, there being mating bearing surfaces respectively on the housing in fixed position relative to the base and on the screw in fixed position relative to the thread, which surfaces have their interface of mutual engagement sloped relative to the direction of the pull of the screw thread on the strap, at an acute angle thereto opening in the direction of the pull, whereby the thread is pressed toward the base by a component of force proportional to the pull of the screw on the strap.

The bearing surface on the screw may be defined by the crest of the frusto-conical, spiral screw thread, in which case the housing presents a mating bearing surface at the side of the screw opposite to the side of the thread engaging the strap.

In an alternative form of the invention, the bearing surface of the screw lies in a radial plane at the large diameter end of the frusto-conical threaded portion of the screw, and the bearing surface of the housing is also planar.

The above, and other objects, features and advantages of the invention, will be apparent in the following detailed description of illustrative embodiments thereof which is to be read in conjunction with the accompanying drawings forming a part hereof, and wherein:

FIG. 1 is a fragmentary perspective view of a screw-operated tightening device embodying this invention;

FIG. 2 is an enlarged sectional view taken along the line 2—2 on FIG. 1;

FIG. 3 is a fragmentary perspective view of a strap or band forming part of the device of FIG. 1;

FIG. 4 is an enlarged detail sectional view, in perspective, of a portion of the strap of FIG. 3;

Figures 5, 6, 7:
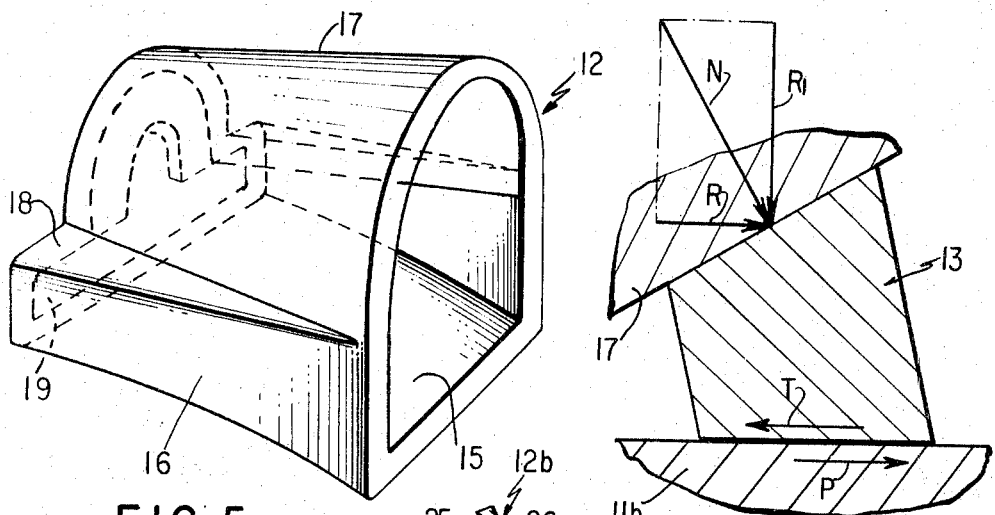
FIG. 5 is a perspective view of a housing or cage also included in the device of FIG. 1.
FIG. 6 is a diagrammatic view representing forces at play in a screw-operated tightening device embodying this invention.
FIG. 7 is a diagrammatic sectional view of another embodiment of the invention.

Referring to the drawings in detail, and initially to FIG. 1 thereof, it will be seen that a screw-operated tightening device 10 of the type to which this invention relates generally includes a band or strap 11 which is drawn through a housing 12 upon rotation of a screw 13 in the housing. Where the device 10 is in the form of a hose clamp, as shown, housing 12 is attached to one end 11a of strap 11 and the other or free end portion 11b of the strap is drawn through the housing upon rotation of screw 13 so that the strap or band forms a circular hoop of progressively decreasing circumference for causing a uniform, radial clamping pressure to be exerted about the periphery of a hose encircled by the strap.

The strap 11 has serrations or a series of transversely directed cuts 14 spaced apart along a substantial portion of the length of the band or strap extending from adjacent the free end 11b thereof for engagement by the thread of screw 13. The cuts 14 may be constituted by slots extending through the strap, but, as shown, they are in the form of grooves or recesses which open only at the surface of the strap or band disposed at the outside of the latter when the strap encircles a hose. Each groove or recess 14 is generally of triangular cross-section, and preferably has one transversely extending wall surface 14a (FIG. 2) which is substantially perpendicular to the outer surface of strap 11 and faces in the direction opposed to the direction of movement of the strap through housing 12. Further, each recess 14 is transversely arcuate so as to have a depth decreasing from a maximum at the center of the strap to the opposite ends of the recess.

The housing 12 includes a base 15 which may be longitudinally arcuate, as shown on FIGS. 2 and 5, side walls 16 extending outwardly along the opposite longitudinal edges of base 15, and an arched roof or wall 17 extending between side walls 16 and fixedly spaced by the latter from base 15. As shown particularly on FIG. 5, side walls 16 have inwardly directed portions 18 which are spaced from base 15 and progressively increase in width toward one end of the housing to define a generally rectangular opening 19, as shown in broken lines, at that one end of housing 12. The height of the rectangular opening 19, that is, the distance between the confronting surfaces of base 15 and inwardly turned wall portion 18 is slightly larger than twice the thickness of strap 11.

The end 11a of strap 11 to be attached to housing 12 may be folded over, as at 20 (FIGS. 1, 2 and 3), or otherwise formed with a stop or abutment. In assembling together strap 11 and housing 12, end 11b of the strap is inserted into the housing through opening 19 and the strap is then drawn through the housing until the folded over end 20 abuts against the end of base 15 adjacent opening 19. Since the thickness of the folded over end 20 is greater than the height of opening 19, the end portion 11a of the strap cannot be pulled through housing 12.

The screw 13 is axially insertable in housing 12 through the relatively wide open end of the housing remote from rectangular opening 19. When thus inserted in housing 12, screw 13 is rotatable and also free to be moved axially and radially. In such radial movement of screw 13, the latter is guided by the sides of housing 12 so as to move toward and away from base 15.

In the device 10 presently being described, a frusto-conical bearing surface is defined by the crest of the frusto-conical spiral thread 21 of the screw 13. Further, the housing 12 has a mating bearing surface defined by the roof or arched wall 17 thereof which is slidably engaged by the frusto-conical thread of the screw. In the housing 12 as shown, roof 17 is half of a frusto-conical surface that is substantially similar to the frusto-conical surface defined by the crest of thread 21 of screw 13. The arched wall or roof 17 slopes downwardly toward base 15 of housing 12 so that such base and the center of roof 17 enclose an angle substantially equal to the total included angle of the frusto-conical thread of screw 13.

The relatively large diameter end of screw 13 has a slot 22, as shown, or other formation by which a tool can engage the screw for effecting rotation of the latter within housing 12.

In use, the above described hose clamp 10 has its strap 11 extended loosely around a hose or other tubular structure to be clamped and the free end portion 11b of the strap is then passed into opening 19 of housing 12 and through the latter so as to overlap end portion 11a of the strap. The screw 13 may be disposed in housing 12 during initial passage of strap end portion 11b through the housing in which case the strap will displace the screw axially in the direction of divergence of roof 17 from base 15 so that additional clearance is provided between thread 21 and end portion 11a of the strap for free passage of strap end portion 11b therebetween. Alternatively, screw 13 may be inserted in housing 12 through the relatively large open end of the latter only after initial passage of strap end portion 11b through housing 12. During such insertion of the screw, or following the initial passage of strap end portion 11b through housing 12 with screw 13 present in the housing, the downwardly sloping underside of arched wall or roof 17 in slidable engagement with the frusto-conical surface defined by the crest of thread 21 urges the screw radially in the direction toward base 15 and thereby positions thread 21 for initial engagement in cuts or serrations 14 of strap 11.

After initial engagement of the thread of screw 13 with cuts or serrations 14 of the strap, rotation of the screw in the direction for drawing end portion 11b of the strap through housing 12 toward the right, as viewed on FIG. 2, decreases the effective circumference of the strap around the hose and thereby exerts a uniform clamping pressure on the latter. It will be apparent that the pull of screw 13 on end portion 11b of the strap, represented by the arrow P on FIG. 6, results in a thrust of the screw in the opposite direction, as represented by the arrow T. The thrust T of the screw is sustained by the bearing surface constituted by the downwardly sloping underside of roof 17 which slidably engages the frusto-conical surface defined by the crest of thread 21 at the side of such surface opposite to the side of the thread engaging cuts or serrations 14 of the strap. The reaction to thrust T is supplied by the force N in the form of the component or vector R of the latter which is parallel, and in the direction opposite to the thrust. This assumes that the friction between the surfaces is negligible. The force N further has a component or vector $R_1$ which is directed perpendicular to strap end portion 11b. Thus, the vector $R_1$ represents a component of force proportional to the pull P of screw 13 on strap 11 and which presses the screw toward base 15 of housing 12 by which the strap is backed up at the region of its engagement with the thread of screw 13. Accordingly, as screw 13 is rotated in the direction for tightening the clamp, and thus exerts a pull of increasing magnitude on the strap, the magnitude of the force pressing thread 21 of screw 13 into engagement with cuts or serrations 14 of the strap is correspondingly increased.

It has been found that, in order to avoid self-locking of screw 13 in housing 12, that is, a component of force urging the screw against the strap which is so large as to unduly resist rotation of the screw in the housing, the total included angle of the frusto-conical surface of screw 13 should be at least about 15°. A total included angle of 30°, as represented on FIG. 2, has been found to be preferred for reasons of practicality in screw production. A very large included angle reduces the length/diameter ratio of the screw and also reduces the width of engagement of the thread at the small diameter end of the screw. Accordingly, the total included angle included by the frusto-conical surface of screw 13 should preferably be less than 45°.

When the housing is stamped or otherwise formed of sheet metal, it has some degree of elasticity which permits the screw to move axially within the housing in the direction of the thrust resulting from the pull of the screw on the strap. Where it is desired to limit the force pressing the thread of screw 13 against the strap on base 15, such limitation can be achieved merely by restricting such axial movement of screw 13 within housing 12 in the direction of the thrust of the screw. The axial movement of screw 13 may be suitably limited merely by forming housing 12 with an end wall 23 (FIG. 2) depending from roof 17 at the end of the housing toward which screw 13 is urged by its thrust. Thus, as the pull of screw 13 on strap 11 is progressively increased, the elasticity of the stamped or thin wall housing 12 permits the screw to advance as the component of force pressing the threads of screw 13 against the strap backed up by base 15 is proportionately increased until the small diameter end of screw 13 engages against end wall 23. Thereafter, further rotation of screw 13 in the direction for increasing its pull on the strap does not further increase the component of force pressing the screw thread into engagement with the strap, as part of the thrust resulting from the pull of the screw on the strap is then taken or sustained by end wall 23.

Although the bearing surface of screw 13 is defined by the crest of spiral thread 21 of the screw in the embodiment of the invention described above, the bearing surface of the screw may be otherwise formed.

In the device 10b of FIG. 7, the strap or band 11 has one end portion 11a attached to the housing 12b and the other end portion 11b of the strap is drawn through the housing in overlapping relation to the end portion 11a which extends over the base 15b of the housing. The screw 13b of device 10b is rotatable in housing 12b and also is free to be moved axially in the housing and radially toward and away from the base 15b.

In the device 10b, the threaded portion 21b of screw 13b is frusto-conical and the bearing surface 25 of the screw is flat or planar and is perpendicular to the axis of the screw at the large diameter end of the threaded portion 21b. In reaction to the pull of thread 21b on serrations 14 of strap 11, the bearing surface 25 of screw 13b is thrust against, and engages slidably a flat or planar bearing surface 26 of housing 12b which is defined by an end wall 27 of the latter. It will be apparent that the interface of mutual engagement of bearing surfaces 25 and 26 is sloped relative to the direction of the pull of thread 21b on serrations 14 of the strap at an acute angle opening in the direction of such pull, that is, toward the left, as viewed on FIG. 7.

As shown, the end wall 27 may have an opening 28 through which a screw driver or other tool can be inserted in a slot or socket 22b located centrally in bearing surface 26 of the screw.

By reason of the slope of the interface of mutual engagement of bearing surfaces 25 and 26, the force N in reaction to the thrust T of the screw 13b against end wall 27 has a vector or component $R_1$ which presses the screw toward base 15b and is proportional to the pull of the screw on the strap.

The arrangement of device 10b permits end portion 11b of the strap which is drawn through housing 12b to emerge and travel away from the latter at the end of the housing which is opposed to the one at which the tool for turning screw 13b is inserted. On the other hand, in each of the previously described devices 10 and 10a, the free end portion 11b of the strap emerges, and travels away from the housing at the same end of the latter as that at which the tool is engaged with the screw. The flat bearing surfaces 25 and 26 of device 10b also have the advantage of providing a relatively large area of sliding contact therebetween.

It will be seen that, in each of the described embodiments of the invention, pressing of the screw thread toward the base of the housing, and hence into the cuts or recesses of the strap, serves to maintain the threaded engagement of the screw with the strap even though the cuts or recesses 14 may be relatively shallow, as when the same do not extend completely through the strap or band. It is further apparent that the component of force holding the screw in engagement with the strap results from the particular cooperative configuration given to the screw and its housing and is achieved without need for bearings to mount the screw or hold it in a fixed position relative to the housing, thereby resulting in a construction of utmost simplicity and reliability, and making possible its manufacture at relatively low cost.

The screw in a device according to the invention can simply be inserted axially into its housing to any position in which its bearing surface will engage the coacting housing surface upon engagement of the screw with serrations of the strap. If the device is to be tightened immediately, the screw may be kept in place merely by the pull exerted upon it by the strap. If the device is to be handled in assembled condition before being tightened on a hose or the like, the screw may be kept properly assembled by any structure at the backward end of the housing, such as a flange, tabs or the like, that will keep the screw from falling out of the housing.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. In a screw-operated tightening device including a housing having a base, a serrated strap to be drawn over said base, and a screw rotatable in the housing and having a spiral frusto-conical thread to engage in serrations of the strap and draw the strap over the base upon rotation of the screw, mating bearing surfaces respectively on said housing in fixed position relative to said base and on said screw in fixed position relative to said thread, said bearing surface on the screw being positioned to be thrust against said bearing surface on the housing in reaction to the pull of said thread on serrations of said strap, the interface of mutual engagement of said bearing surfaces being sloped relative to the direction of said pull at an acute angle thereto opening in said direction and said screw being free to slide along said bearing surface on said housing, whereby said thread is pressed toward said base by a component of force proportional to said pull.

2. A screw-operated tightening device as in claim 1; wherein said bearing surface on said screw is constituted by the crest of said frusto-conical thread, and said bearing surface on said housing is engaged by said crest at the side of said thread opposite to the side of said thread engaging the strap.

3. A screw-operated tightening device as in claim 2; wherein said bearing surface on the housing is constituted by a wall of said housing which is concave toward said base and has substantially the configuration of a sector of a conical frustum.

4. A screw-operated tightening device as in claim 1; wherein the crest of said frusto-conical screw thread lies on the surface of a cone having an angle of between 15° and 45°.

5. A screw-operated tightening device as in claim 1; said housing further comprising abutment means engageable by a portion of said screw to stop sliding movement of the screw along said bearing surface on said housing when said thread has been pressed as aforesaid to a predetermined limit of displacement toward said base.

6. A screw-operated tightening device as in claim 1; wherein said bearing surface on said screw lies in a flat plane transverse to the axis of the screw and is disposed adjacent the large diameter end of said frusto-conical thread; and wherein said bearing surface of the housing is also flat and disposed substantially at said acute angle with respect to said base.

7. In a screw-operated tightening device including a housing having a base, a strap to be drawn over said base having a series of transversely directed cuts spaced apart along the strap and opening at the surface of the strap facing away from said base, and a screw rotatable in the housing and having a frusto-conical spiral thread to engage in said cuts and draw the strap over the base upon rotation of the screw, said housing having a roof spaced from and presenting a bearing surface sloped toward said base in position to be engaged slidably by the crest of said frusto-conical thread at the side thereof opposite to the side thereof engaging said strap, said screw being free to slide along said sloped bearing surface so that as the screw is rotated to draw said strap over said base the resulting thrust of the screw against said sloped bearing surface forces the screw in the direction to hold said thread pressed into said cuts.

8. A screw-operated tightening device as in claim 7; said bearing surface having the form of a sector of a conical frustum substantially mating with the conical frustum occupied by the crest of said thread.

9. In a screw-operated hose clamp including a housing having a base, a strap adapted to encircle a hose and having a series of transversely directed cuts opening at the outer surface of the strap and spaced apart along the latter, said housing being attached to one end of the strap and shaped to have the other end of the strap drawn through the housing over said base for tightening the strap around a hose, and a screw rotatable in the housing and having a frusto-conical spiral thread to engage in said cuts and thereby draw said other end of the strap through the housing upon rotation of the screw, said housing having a roof in the form of a sector of a conical frustum, which sector is inclined toward said base and contracts in radius in the direction opposite to that in which the strap is to be drawn through the housing, the crest of said thread mating with and bearing against and being slidable axially along said roof at the side of said screw opposite to the side thereof engaging said strap, so that as said screw is rotated to pull on the strap the resulting thrust of said screw is in part sustained by said roof and in part acts to press said thread into said cuts.

10. A screw-operated hose clamp as in claim 9; wherein said housing further includes side walls joining said roof to said base and laterally guiding said strap over the base.

11. A screw-operated hose clamp as in claim 9; wherein said housing further has an end wall toward which the screw is urged by said thrust and which is engageable by an end of said screw to stop further axial sliding movement of said screw along said roof when said thread has been pressed to a predetermined depth in said cuts.

References Cited by the Examiner

UNITED STATES PATENTS

| 2,767,455 | 10/1956 | Schaefer | 24—274 |
| 2,820,276 | 1/1958 | Clauss et al. | 24—274 |
| 2,910,758 | 11/1959 | Arthur | 24—274 |
| 3,100,327 | 8/1963 | Spector | 24—274 |

FOREIGN PATENTS

| 542,482 | 1/1942 | Great Britain. |
| 586,235 | 3/1947 | Great Britain. |
| 266,906 | 8/1929 | Italy. |
| 80,296 | 1/1956 | Netherlands. |

WILLIAM FELDMAN, *Primary Examiner.*

D. GRIFFIN, *Examiner.*